(12) United States Patent
Hurley et al.

(10) Patent No.: US 6,823,120 B2
(45) Date of Patent: Nov. 23, 2004

(54) TRANSMIT/RECEIVE OPTICAL CABLES

(75) Inventors: William C. Hurley, Hickory, NC (US); Aaron J. Plaski, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 7 days.

(21) Appl. No.: 10/209,485

(22) Filed: Jul. 31, 2002

(65) Prior Publication Data

US 2004/0022504 A1 Feb. 5, 2004

(51) Int. Cl.[7] ............................................. G02B 6/44
(52) U.S. Cl. ..................................................... 385/112
(58) Field of Search ........................... 385/100, 109–112

(56) References Cited

U.S. PATENT DOCUMENTS

| | | |
|---|---|---|
| 5,221,387 A | 6/1993 | Robbins et al. ............... 156/85 |
| RE36,157 E | 3/1999 | Robbins et al. ............... 156/85 |
| 5,982,967 A | 11/1999 | Mathis et al. ............... 385/102 |
| 6,256,445 B1 | 7/2001 | Jennings et al. ............ 385/135 |
| 6,347,172 B1 | 2/2002 | Keller et al. ................ 385/102 |
| 6,356,690 B1 * | 3/2002 | McAlpine et al. .......... 385/109 |
| 6,510,147 B1 * | 1/2003 | Sun et al. .................... 370/335 |

OTHER PUBLICATIONS

Corning, "Corning InfiniCor® 600 Optical Fiber", Mar. 2002.
Corning, "Corning InfiniCor® CL 1000 Optical Fiber", Mar. 2002.
Corning, "Corning InfiniCor® 300 Optical Fiber", Mar. 2002.
Corning, "Corning InfiniCor® SX+ Optical Fiber", Mar. 2002.

* cited by examiner

Primary Examiner—Javaid H. Nasri
(74) Attorney, Agent, or Firm—Michael E. Carroll, Jr.

(57) ABSTRACT

An optical cable includes a first optical waveguide and a second optical waveguide having predetermined bandwidth capacities. A bandwidth capacity ratio is defined as the predetermined bandwidth capacity between the first and second optical waveguides. The bandwidth capacity ratio being about 2:1 or greater, however, other suitable ratios can be used. Other embodiments identify one of the legs of an optical cable by using a marking indicia. Additionally, another embodiment employs a translucent jacket for aiding in identifying each optical waveguide.

22 Claims, 3 Drawing Sheets

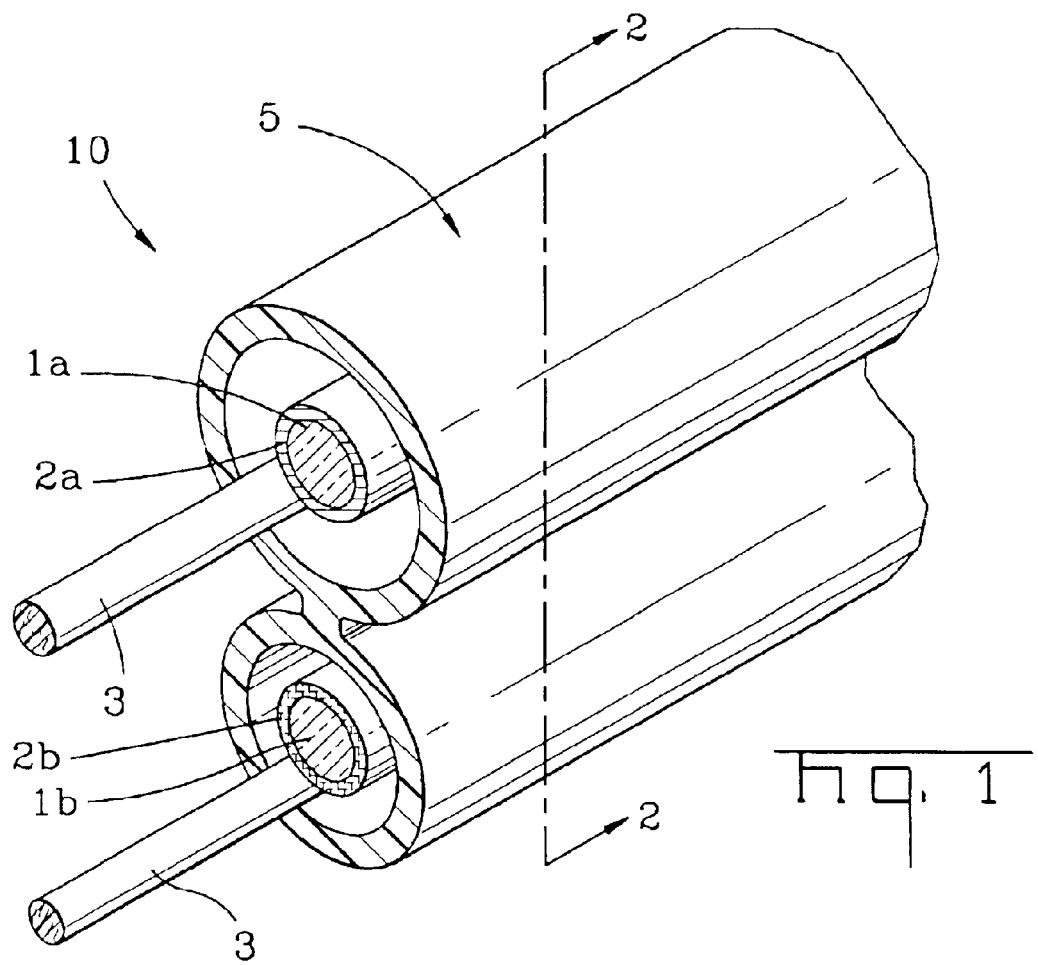
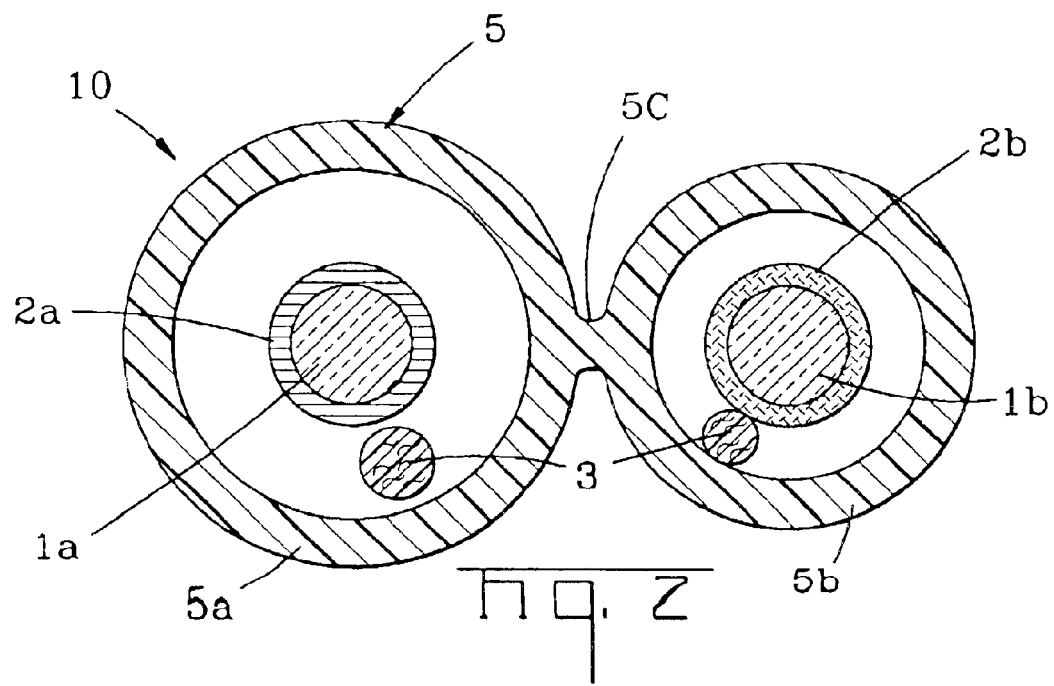

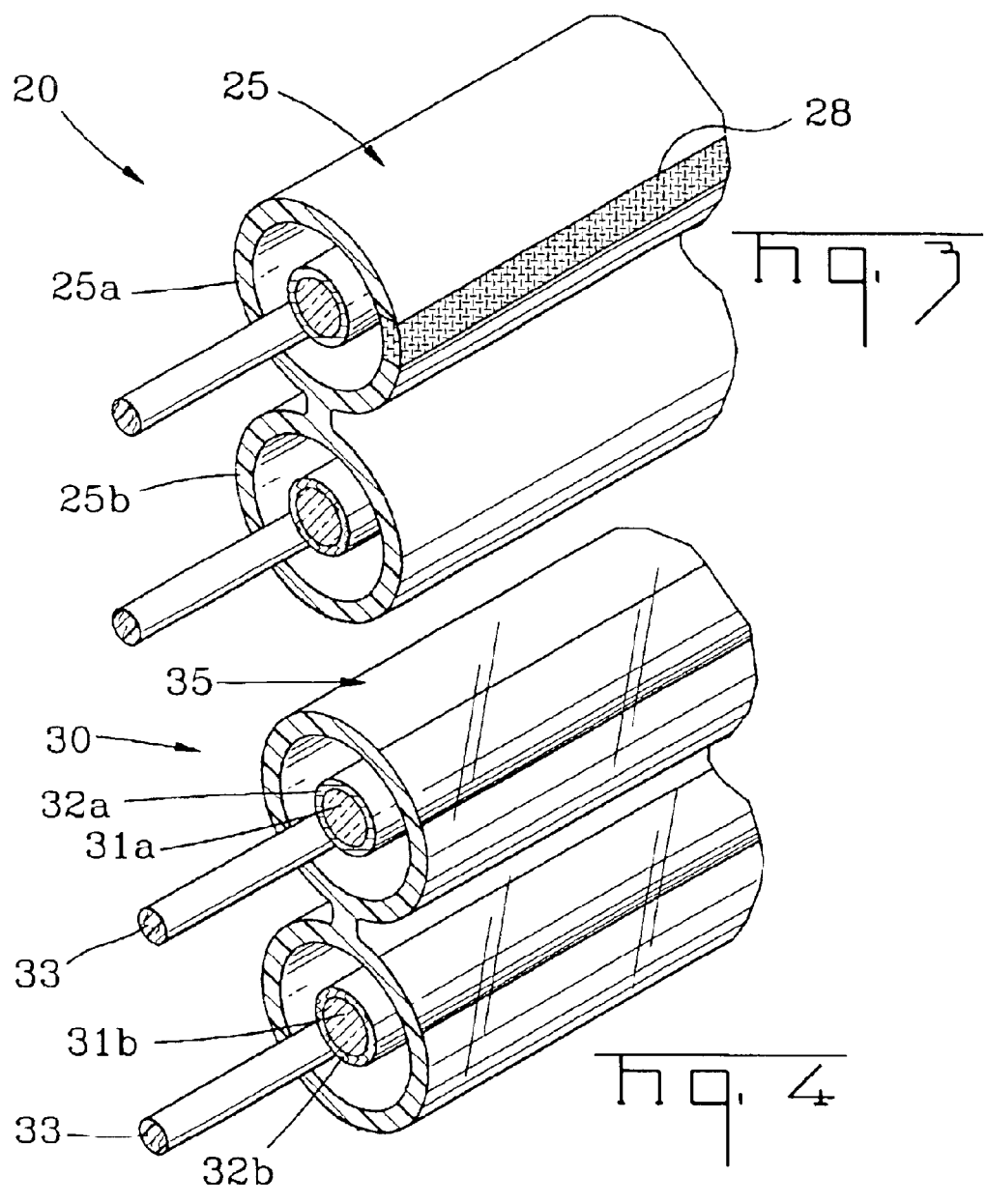
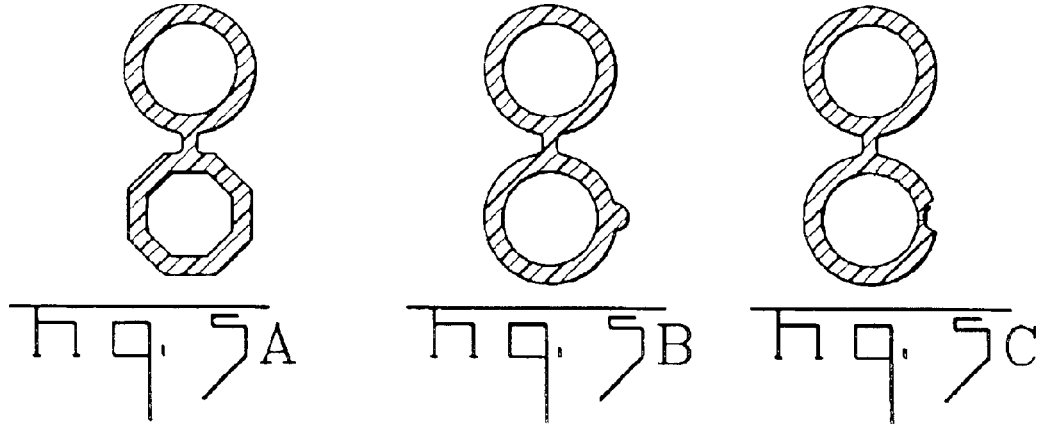

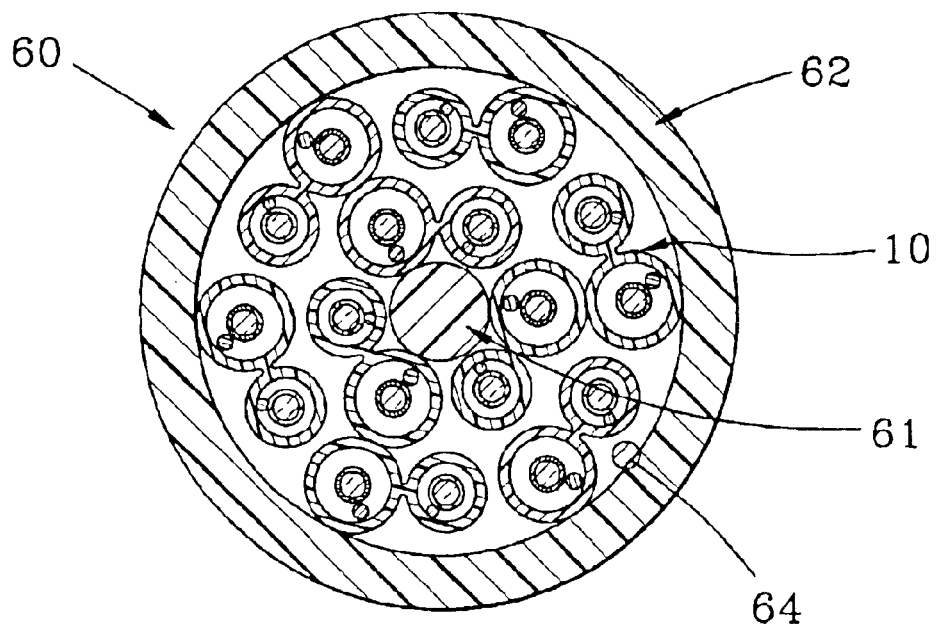
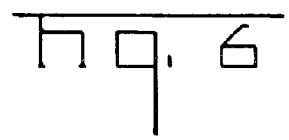
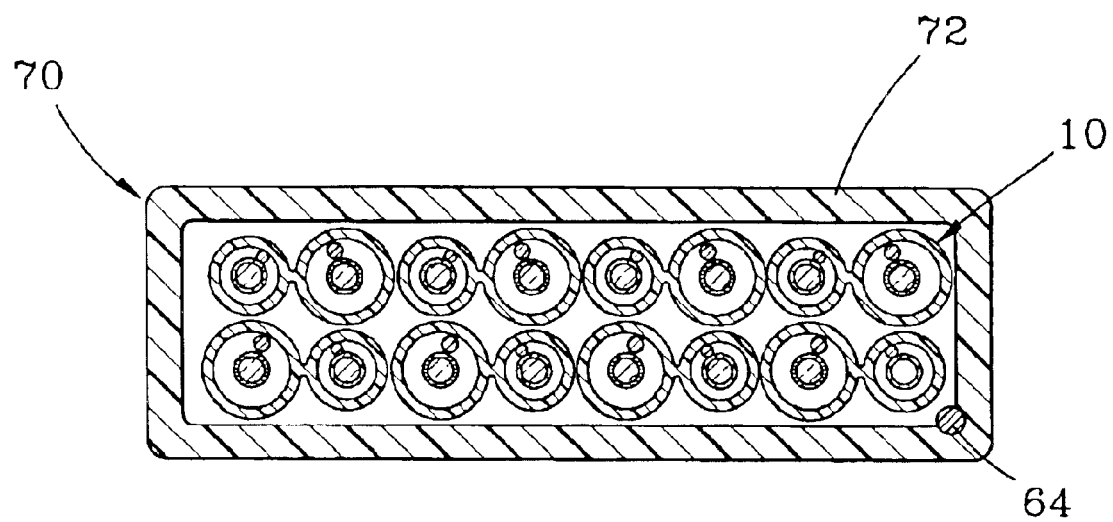
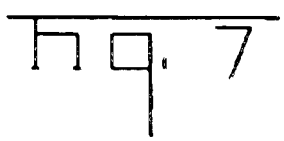

TRANSMIT/RECEIVE OPTICAL CABLES

FIELD OF THE INVENTION

The present invention relates generally to optical cables. More specifically, the invention relates to transmit/receive optical cables.

BACKGROUND OF THE INVENTION

Optical cables include optical waveguides such as optical fibers that transmit optical signals such as voice, video, and/or data information. One type of fiber optic cable design is a zipcord cable. A zipcord cable has two legs each with an optical fiber therein with a jacket generally surrounding each leg. A web portion of the jacket connects the two legs of the jacket forming a preferential tear portion so the craftsman can separate the legs and route the respective optical fibers to their desired locations. Additionally, the optical fiber within each leg includes a colored buffer layer thereon for identification of the optical fibers.

One use for zipcords is transmitting optical signals to, and receiving optical signals from, a desktop location such as a computer, a printer, or interactive cable television. Generally, a first optical fiber of the zipcord is a dedicated transmitting link and the second optical fiber is a dedicated receiving link. In other words, the first optical fiber transmits optical signals from a first server to the desktop location and the second optical fiber is routed to a second server that receives optical signals from the desktop location. Moreover, the transmitting optical link to the desktop generally runs at a relatively high bandwidth, while the receiving optical link from the desktop generally runs at a lower bandwidth. Thus, identification of the legs of a zipcord is important to properly connect the system.

Although, conventional optical fiber zipcords use optical fibers having different colored buffer layers for identification, the buffer layers are hidden when an end of the cable is connectorized. One way of identifying legs of the zipcord after connectorization is by attaching an adhesive label to the connector during the installation of the same; however, the identification should be robust and the labels are apt to come off the connector. Another method of identifying legs is having regularly spaced print statements on one leg of the jacket. Although, the print statement is visible this method has disadvantages. For instance, one disadvantage is that the print statement may not be near the end of the cable, thereby requiring tracing of the print statement. Moreover, the cable can be twisted making tracing of a leg having the print statement a cumbersome, time-consuming, and difficult task. Thus, there is a need for quickly and accurately identifying legs of an optical cable.

SUMMARY OF THE INVENTION

The present invention is directed to an optical cable including a first optical waveguide having a predetermined bandwidth capacity and a second optical waveguide having a predetermined bandwidth capacity. A bandwidth capacity ratio being defined as the predetermined bandwidth capacity between the first and second optical waveguides, the bandwidth capacity ratio being about 2:1 or greater.

In another aspect, the present invention is directed to an optical cable including a first optical waveguide having a first buffer layer that is a first color, a second optical waveguide having a second buffer layer that is a second color, and a jacket. The jacket being a third color and having a first leg and a second leg that respectively surround the first and second optical waveguides. The first leg of the jacket is a first shade of the third color and the second leg of the jacket is a second shade of the third color due to the different colors of the first and second buffer layers within the respective legs.

The present invention is further directed to an optical cable including a first optical waveguide, a second optical waveguide, and a jacket. The jacket has a first leg and a second leg connected by a web. A portion of the first optical waveguide is disposed within the first leg of the jacket and a portion of the second optical waveguide is disposed within the second leg of the jacket. The first leg being a different color than a portion of the second leg.

Additionally, the present invention is directed to an optical cable including a first optical waveguide having a predetermined bandwidth capacity, a second optical waveguide having a predetermined bandwidth capacity, and a jacket. A bandwidth capacity ratio being defined as the predetermined bandwidth capacity between the first and second optical waveguides, the bandwidth capacity ratio being about 2:1 or greater. The jacket having a first leg and a second leg connected by a web, wherein the first leg has a shape that is different than a shape of the second leg.

BRIEF DESCRIPTION OF THE FIGS.

FIG. 1 is a perspective view of a fiber optic cable according to the present invention.

FIG. 2 is a cross-sectional of a fiber optic cable according to FIG. 1 taken along line 2—2.

FIG. 3 is a perspective view of another embodiment according to the present invention.

FIG. 4 is a perspective view of another embodiment according to the present invention.

FIGS. 5a–5c are cross-sectional views of other embodiments according to the present invention.

FIG. 6 is a cross-sectional view of another embodiment according to the present invention.

FIG. 7 is a cross-sectional view of another embodiment according to the present invention.

DETAILED DESCRIPTION OF THE INVENTION

FIGS. 1 and 2 depict an optical cable 10 according to the present invention that includes optical waveguides such as a first optical fiber 1a having a buffer layer 2a, a second optical fiber 1b having a buffer layer 2b, at least one strength member 3, and a jacket 5. Buffer layers 2a, 2b respectively surround optical fibers 1a, 1b, thereby protecting the same. For purposes of illustration, buffers 2a, 2b are hatched with different patterns, thereby representing buffer layers 2a, 2b that are, for example, blue and orange respectively. According to this embodiment of the present invention, optical fibers 1a, 1b have a respective predetermined bandwidth capacity. Moreover, in accordance with one aspect of the present invention, optical fibers 1a, 1b have a bandwidth capacity ratio of about 2:1 or greater, thereby tailoring the capacity of optical fiber based upon the data transfer rates of the system link. In other words, optical fiber 1a is the transmitting link and optical fiber 1b is a receiving link of optical cable 10, but the links may be reversed. Jacket 5 includes two legs 5a, 5b connected by a web 5c. Legs 5a, 5b generally surround a predetermined buffered optical fiber for identifying bandwidth capacity of the same. For example, leg 5a has a different shape than leg 5b, i.e., leg 5a is larger than leg 5b and surrounds the high capacity optical fiber 1a so that the craftsman can easily and accurately identify the high bandwidth leg 5a and properly connect the same. Furthermore, web 5c provides a preferential tear portion, thereby allowing the craftsman to easily separate legs 5a, 5b. Optical cable 10 also includes at least one strength member disposed within each leg 5a, 5b of jacket 5. Additionally, optical cable 10 can have other suitable components or features such as a water-swellable component or a ripcord.

Each optical fiber 1a, 1b can include a silica-based core that is operative to transmit light and is surrounded by a silica-based cladding having a lower index of refraction than the core. Additionally, one or more coatings can be applied to optical fibers 1a, 1b. For example, a soft primary coating surrounds the cladding, and a relatively rigid secondary coating surrounds the primary coating. The coating can also include an identifying means such as ink or other suitable indicia for identification of the optical fiber.

Optical fibers 1a, 1b have a respective bandwidth capacity ratio of about 2:1 or greater, but other embodiments of the present invention can use optical waveguides with other suitable ratios such as about 1:1. In one embodiment, optical fibers 1a, 1b are multi-mode optical fibers. For example, optical fiber 1a is an InfiniCor® SX+, and optical fiber 1b is an InfiniCor® 300, which are both commercially available from Corning, Incorporated of Corning, N.Y. The Infini-Cor® SX+ and InfiniCor® 300 have respective bandwidths of about 2000 MHz□km and about 220 MHz□km using a laser-based source at a reference wavelength of about 850 nm for a bandwidth capacity ratio of about 10:1. Other embodiments can include bandwidth capacity ratios of about 100:1, 1000:1, or any other suitable ratio. Additionally, other suitable optical waveguides can be used such as single-mode, pure-mode, plastic optical fibers, erbium doped, or polarization-maintaining optical waveguides. In another embodiment, optical fiber 1b has a bandwidth of about 100 KHz□km or more.

Jacket 5 is preferably constructed of a polymeric material having legs 5a, 5b that are suitably dimensioned for identifying, for example, the bandwidth capacity of optical fibers 1a, 1b. However, other embodiments of the present invention can have a marking indicia for identifying legs 5a, 5b having a similar size and/or shape. Jacket 5 can also include additives for improving flame-retardance; however, other suitable additives can be used for other purposes. Additionally, other suitable materials and/or shapes can be used for jacket 5. For instance, FIGS. 5a–5c illustrate different shapes for the jacket that allow for identification of one of the legs by sight or touch.

FIG. 3 depicts an optical cable 20, which is similar to optical cable 10. Optical cable 20 includes legs 25a, 25b of jacket 25 that are similar in size and shape. Leg 25a has a marking indicia 28 thereon, but the indicia can be on either leg so long as either a transmit or receive optical waveguide can be identified. Marking indicia 28 can be a periodic print statement, a continuous print statement, a tracer stripe, or any other suitable indicia. In one embodiment, jacket 25 includes marking indicia 28 on leg 25a, thereby identifying the high bandwidth capacity optical fiber 21a. However, marking indicia can be used to identify transmit and receive optical fibers having the same bandwidth capacity. In other embodiments, marking indicia 28 is formed by co-extruding jacket materials having two different colors, which is depicted by the shaded portion of leg 25a. For example, a portion of leg 25a is formed by extruding a black polymer 28 with the remainder of leg 25a and leg 25b being a yellow polymer; however, other color combinations can be used.

Other embodiments of the present invention can employ the concepts of the present invention. For instance, FIG. 4 depicts an optical cable 30 that is similar to optical cable 20. Optical cable 30 has a first optical fiber 31a having a buffer layer 32a and a second optical fiber 31b having a buffer layer 32b. The buffer layers 32a, 32b are formed from two different colors as illustrated by the hatching thereon. Optical cable 20 includes strength members 33 such as aramid or fiberglass in each leg. However, other embodiments of the present invention can exclude strength members or have more than one strength member in each leg. Where more than one strength member is used, they preferably are evenly distributed around the optical fiber. Additionally, the strength members in the respective legs can be different colors, thereby aiding in identification of the legs.

In this embodiment, jacket 35 is formed from a translucent polymeric material so the craftsman can advantageously identify the legs even after connectorization. As used herein, translucent means that the buffer layers and/or strength members disposed within the jacket are discernable to the craftsman with his naked eye when viewing the jacket of optical cable 30 or the legs of jacket appear as different shades of color due to the components disposed within the respective legs. The translucent characteristic of jacket 35 is illustrated by the fact that buffer layers 32a, 32b can be seen when the jacket is disposed around the same. In one embodiment, jacket 25, or a portion thereof, is formed from a relatively clear polymer allowing viewing of buffer layers 32a, 32b and/or the strength members. In another embodiment, jacket 25 is formed by controlling the wall thickness of a colored jacket and/or the concentration of color chips used in the jacket material so that colored jacket of the finished cable appears as two different shades of the same color. For example, jacket 25 is formed from a yellow polymer having relatively thin walls and/or low concentration of color chips so that an orange and a blue buffer layer 32a, 32b disposed within jacket 25 causes legs 25a, 25b to appear as different shades of yellow that are discernable by the craftsman. The cable can also include one or more strength members. Where a plurality of strength members are used in a leg, they are preferably are evenly distributed around the optical waveguides, thereby forming a thin layer that can allow light to pass thereby. This embodiment advantageously allows the use of conventional color-coding while allowing easy and continuous identification of the legs of the cable. Additionally, other colors can be used for jacket 25 and/or the buffer layers.

Fiber optic cables of the present invention can also be used as a portion of a breakout cable. FIG. 6 depicts fiber optic cable 10 as a portion of a breakout cable 60. Cable 60 includes a central strength member 61 having a plurality of fiber optic cables 10 stranded therearound and a jacket 62. Cable 60 also includes a ripcord 64 for opening jacket 62. FIG. 7 depicts another breakout cable 70. Cable 70 has a plurality of fiber optic cables 10 arranged horizontally within a rectangular jacket 72; however, fiber optic cables 10 can have other arrangements such as vertical.

Many modifications and other embodiments of the present invention, within the scope of the appended claims, will become apparent to a skilled artisan. For example, the legs of optical fiber cable can include more than one optical fiber, or have other suitable optical waveguides. Additionally, the present invention can include other suitable components such as a ripcord, a water-swellable material, or other suitable components. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers in a zipcord, but the inventive concepts of the present invention are applicable to other suitable optical waveguides and fiber optic cable configurations as well.

That which is claimed:

1. An optical cable comprising:
   a first optical waveguide, the first optical waveguide having a predetermined bandwidth capacity; and
   a second optical waveguide, the second optical waveguide having a predetermined bandwidth capacity, wherein a bandwidth capacity ratio is defined as the predetermined bandwidth capacity between the first end second optical waveguides, the bandwidth capacity ratio being about 2:1 or greater.

2. The optical cable of claim 1, further comprising a first leg and a second leg, the first leg having a portion of the first optical waveguide disposed therein, the second leg having a portion of the second optical waveguide disposed therein, and one of the legs having a marking indicia thereon.

3. The optical cable of claim 2, the marking indicia being continuous.

4. The optical cable of claim 1, further comprising a jacket having a first leg and a second leg connected by a web, a portion of the first leg being a different color than the second leg.

5. The optical cable of claim 1, further comprising at least one strength member.

6. The optical cable of claim 1, further comprising:
   a first buffer layer, the first buffer layer being disposed about the first optical waveguide;
   a second buffer layer, the second buffer layer being disposed about the second optical waveguide; and
   a jacket, the jacket generally surrounds the first and second buffer layers, wherein the jacket is translucent so that the first and second buffer layers are discernable.

7. The optical cable of claim 1, the predetermined bandwidth capacity of the second optical waveguide being about 100 KHz■km or more.

8. The optical cable of claim 1, the cable being a portion of a breakout cable.

9. The optical cable of claim 1, further comprising a first leg and a second leg, the first leg having a portion of the first optical waveguide disposed therein, the second leg having a portion of the second optical waveguide disposed therein, and the first leg having a different shape than the second leg.

10. An optical cable comprising:
    a first optical waveguide having a first buffer layer, the first buffer layer being a first color;
    a second optical waveguide having a second buffer layer, the second buffer layer being a second color, wherein the first optical waveguide having a predetermined bandwidth capacity, and the second optical waveguide having a predetermined bandwidth capacity, wherein a bandwidth capacity ratio is defined as the predetermined bandwidth capacity between the first and second optical waveguides, the bandwidth capacity ratio being about 2:1 or greater; and
    a jacket, the jacket being a third color and having a first leg and a second leg that respectively surround the first and second optical waveguides, wherein the first leg of the jacket is a first shade of the third color and the second leg of the jacket is a second shade of the third color due to the different colors of the first and second buffer layers within the respective legs.

11. The optical cable of claim 10, the cable being a portion of a breakout cable.

12. The optical cable of claim 10, further comprising at least one strength member.

13. The optical cable of claim 10, the predetermined bandwidth capacity of the second optical waveguide being about 100 KHz■km or more.

14. An optical cable comprising:
    a first optical waveguide, the first optical waveguide having a predetermined bandwidth capacity;
    a second optical waveguide, the second optical waveguide having a predetermined bandwidth capacity, wherein a bandwidth capacity ratio is defined as the predetermined bandwidth capacity between the first and second optical waveguides, the bandwidth capacity ratio being about 2:1 or greater; and
    a jacket having a first leg and a second leg connected by a web, wherein a portion of the first optical waveguide is disposed within the first leg, a portion of the second optical waveguide is disposed within the second leg, and the first leg is a different color than a portion of the second leg.

15. The optical cable of claim 14, the cable being a portion of a breakout cable.

16. The optical cable of claim 14, the portion of the first leg that is a different color being a continuous marking indicia.

17. The optical cable of claim 14, the portion of the first leg that is a different color being co-extruded with the first leg.

18. An optical cable comprising:
    a first optical waveguide, the first optical waveguide having a predetermined bandwidth capacity;
    a second optical waveguide, the second optical waveguide having a predetermined bandwidth capacity, wherein a bandwidth capacity ratio is defined as the predetermined bandwidth capacity between the first and second optical waveguides, the bandwidth capacity ratio being about 2:1 or greater; and
    a jacket having a first leg and a second leg connected by a web, wherein the first leg has a shape that is different than a shape of the second leg.

19. The optical cable of claim 18, the first leg being larger than the second leg.

20. The optical cable of claim 18, the cable being a portion of a breakout cable.

21. The optical cable of claim 18, further comprising at least one strength member.

22. The optical cable of claim 18, the predetermined bandwidth capacity of the second optical waveguide being about 100 KHz■km or more.

* * * * *